(12) United States Patent
Allen et al.

(10) Patent No.: US 10,087,618 B2
(45) Date of Patent: Oct. 2, 2018

(54) SYSTEM AND METHOD FOR INTERLOCKING STRUCTURAL MEMBERS

(71) Applicant: HFW Solutions, Inc., Rapid City, SD (US)

(72) Inventors: Casey Dean Allen, Rapid City, SD (US); Bryan Matthew Tweedy, Rapid City, SD (US)

( * ) Notice: Subject to any disclaimer, the term of this patent is extended or adjusted under 35 U.S.C. 154(b) by 0 days.

(21) Appl. No.: 15/217,359

(22) Filed: Jul. 22, 2016

(65) Prior Publication Data

US 2018/0023286 A1    Jan. 25, 2018

(51) Int. Cl.
| | |
|---|---|
| *E04B 2/00* | (2006.01) |
| *E04B 1/61* | (2006.01) |
| *E04C 2/08* | (2006.01) |
| *E04C 2/34* | (2006.01) |
| *B23K 20/12* | (2006.01) |
| *B23K 20/233* | (2006.01) |
| *B23K 103/10* | (2006.01) |
| *B23K 101/18* | (2006.01) |

(52) U.S. Cl.
CPC .............. *E04B 1/61* (2013.01); *B23K 20/127* (2013.01); *B23K 20/2336* (2013.01); *E04C 2/08* (2013.01); *E04C 2/3405* (2013.01); *B23K 2201/18* (2013.01); *B23K 2203/10* (2013.01); *E04B 2103/06* (2013.01)

(58) Field of Classification Search
CPC .......... E04B 1/61; E04B 2103/06; E04C 2/08; E04C 2/3405; B23K 20/2336; B23K 20/127; B23K 2201/18; B23K 2203/10
USPC ............................ 52/588.1, 592.1; 228/112.1
See application file for complete search history.

(56) References Cited

U.S. PATENT DOCUMENTS

| | | | | |
|---|---|---|---|---|
| 4,966,082 A | * | 10/1990 | Takeichi | ............. E04B 1/34336 |
| | | | | 105/422 |
| 5,351,990 A | * | 10/1994 | Thomas | ............. B62D 25/2054 |
| | | | | 280/789 |
| 5,816,010 A | * | 10/1998 | Conn | ........................ E04C 2/08 |
| | | | | 52/177 |

(Continued)

FOREIGN PATENT DOCUMENTS

| | | |
|---|---|---|
| EP | 0 893 189 B1 | 5/2004 |
| KR | 10 1307294 | 9/2013 |
| KR | 10 2014 0040339 | 4/2014 |

OTHER PUBLICATIONS

International Search Report and Written, Opinion dated Oct. 30, 2017 issued in PCT/US2017/043321.

*Primary Examiner* — Basil S Katcheves
(74) *Attorney, Agent, or Firm* — Gordon Rees Scully Mansukhani, LLP

(57) ABSTRACT

A panel structure includes panel members that may be connected together using friction stir welding, Each of the panel members includes a first plate, a second plate substantially in parallel to said first plate, and at least one webbing member connecting the first plate and the second plate. The first plate of the first panel member includes a flange positioned in abutment with a flange located on the first plate of the second panel member. The flange of the first panel member includes a projection and the flange of the second panel member includes a groove. The panel members are connected so that the projection is engaged with the groove to thereby resist relative lateral movement that would separate the panel members.

18 Claims, 4 Drawing Sheets

(56) References Cited

U.S. PATENT DOCUMENTS

| | | | |
|---|---|---|---|
| 6,045,207 A | 4/2000 | Rosen et al. | |
| 6,193,137 B1* | 2/2001 | Ezumi | B23K 20/122 |
| | | | 228/112.1 |
| 6,250,037 B1* | 6/2001 | Ezumi | B21C 23/145 |
| | | | 52/592.1 |
| 6,582,831 B2* | 6/2003 | Ezumi | B23K 20/122 |
| | | | 428/598 |
| 6,585,443 B2* | 7/2003 | Aota | B23K 20/122 |
| | | | 228/112.1 |
| 2002/0148879 A1 | 10/2002 | Ezumi et al. | |
| 2003/0042293 A1* | 3/2003 | Ezumi | B23K 20/122 |
| | | | 228/112.1 |
| 2003/0230625 A1* | 12/2003 | Aota | B23K 20/122 |
| | | | 228/112.1 |
| 2005/0247756 A1 | 11/2005 | Frazer et al. | |

\* cited by examiner

SYSTEM AND METHOD FOR INTERLOCKING STRUCTURAL MEMBERS

The present application relates generally to structures and methods for structural members including, for example, panels such as panel members that are joined through various methods including, for example, fusion welding, friction stir welding, and mechanical fastening applications.

A panel type structural member may be formed by connecting structural members. The connected members form a panel that includes two generally parallel plates. The plates may be spaced vertically apart by internal vertical, slanted, trapezoidal, or triangular members similar in nature to the way webbing spaces two horizontal surfaces in I-beams. The internal webbing or ribbing serves to distribute loads imparted on the horizontal surfaces of the panels. Additionally, the webbing rigidly resists deflection and torsion resulting from the loads imparted on the horizontal panels.

Creating structural panels from lightweight metals, such as aluminum, is advantageous for several reasons. Decreasing the weight of the panel in a structure may allow for increased loading on the panel and assembled structure. Aluminum panels can be prefabricated in modular units and joined together on site when placed in service. Aluminum panels are more easily transported than heavier metals or preformed concrete. Aluminum panels may be employed in new structures, or the panels may be used to refurbish an aging structure.

Modular panels may be joined at their vertical seam abutments by various welding, filling, or fastening methods. Welding the panel faying surfaces (abutments) typically provides for more rigidity and increased load distribution, whereas non-welded fasteners allow enhanced and semi or fully-independent movement as between modular panels under changing load conditions. In applications where welded joints are desired, the use of friction stir welding ("FSW") techniques has developed as one possible method for joining the panel members.

Friction stir welding generally includes the application of a pin or probe to the surface of a joint or seam. The pin applies pressure and friction, typically by spinning, on the seam sufficient to cause the metal of the faying surface to plasticize. The pin may be separately heated, but typically is designed to cause the metal to plasticize purely as a result of pressure without the need for additional heat or electricity. The pin moves along the length of the faying surface, and the plasticized metals from adjoining members are effectively "stirred" and intermix in the void created by the pin movement, thereby creating a weld seam.

Additionally, traditional FSW processes impart not only axial forces normal to the plane of the abutment flanges, but FSW effectively imparts lateral forces as well. The surfaces of the structural members to be welded are generally positioned adjacent to each other using simple square butt weld joints or simple overlap joints. When an FSW pin imparts pressure on the structural members being welded, these members may be forced away from each other. The type of joints currently employed in these structural members provide no resistance to lateral separation during the welding process. As a result, conventional processes require the use of significant clamping forces to ensure that the structural members do not separate laterally during the welding process.

Accordingly, a need exists for a structure and method for joining panel members for assembly using FSW techniques.

SUMMARY

As described below, a panel structure that is adapted to be friction stir welded is disclosed herein. The structure includes a first panel member arranged against a second panel member. Each of the first and second panel members includes a first plate, a second plate substantially in parallel to said first plate, and at least one webbing member connecting the first plate and the second plate. The first plate of the first panel member includes a flange positioned in abutment with a flange located on the first plate of the second panel member. The flange of the first panel member includes a projection and wherein the flange of the second panel member includes a groove. The panel members are connected so that the projection is engaged with the groove to thereby resist relative lateral movement that would separate the panel members.

A panel structure including structural members connected together by a friction stir welding process is disclosed herein. The structure includes first and second panel members that include top and bottom plates connected together by a plurality of ribs. The top plates of the first and second panel members are connected together using friction stir welding. The top plate of the first panel member includes a projection that fits in a recess located in the top plate of the second panel member to thereby resist lateral separation of the panel members in response to forces applied to the panel members during the friction stir welding process.

A method of making a panel the structure is also disclosed. The method includes the step of providing first and second panel members, wherein each of the panel members includes a first plate, a second plate substantially in parallel to said first plate, and at least one webbing member connecting the first plate and the second plate. According to the method, the panel members are positioned so that a flange located on the first plate of the first panel abuts a flange located on the first plate of the second panel member. The positioning step includes positioning a projection located on the flange of the first panel member into engagement with a groove located on the flange of the second panel member to thereby resist relative lateral movement that would separate the panel members. The first and second panel members using a friction stir welding process.

It is to be understood that both the foregoing general description and the following detailed description are exemplary and explanatory only, and are not restrictive of the invention as claimed.

DETAILED DESCRIPTION

The structure and methods described herein for automatically aligning panel members for FSW applications can now be better understood turning to the following detailed description. It is to be understood that the illustrated embodiments are set forth as examples and not intended to limit the scope of the claims.

Figure 1:
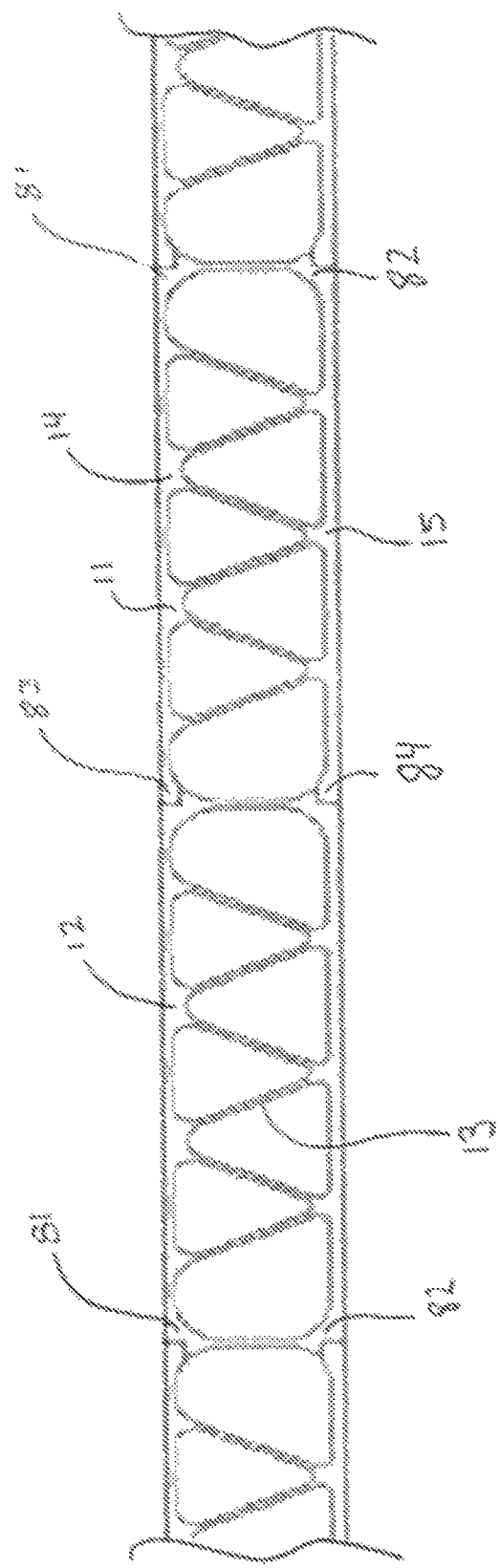
FIG. 1 is a vertical elevation view of a portion of a panel structure showing several panel members connected together at abutment joints.

FIG. 1 discloses an end view of a portion of a panel structure including several connected structural members. Each of the structural members is aligned together using abutment joints and may preferably be welded together using, for example, a FSW process. As shown in FIG. 1, a first panel member 12 and a second panel member 14 are positioned adjacent to each other. Each member 12, 14 includes an upper plate 11 and a lower plate 15. The plates are connected together by internal walls, webbing or ribs 13 that separate the upper plate 11 to the lower plate 15. The internal webbing 13 may extend vertically or at an angle as between upper and lower plates 11, 15.

The lateral edges of the upper and lower plates 11, 15 that abut another panel member include flanges. The flanges may be configured as either male or female projections. As shown in FIG. 1, one structural member 12 includes female flanges 81, 82 at both lateral edges including the top and bottom panels. The adjacent structural member 14 includes male flanges 83, 84 at one lateral edge and female flanges 81, 82 at the opposite lateral edge. The configuration of the structural members 12, 14 may be varied depending on the configuration. For example, a structural member may be configured to include a female/female flange configuration as depicted by the structural member 12 shown in FIG. 1. However, male/male and male/female configurations are also suitable depending on the project being assembled. Also, the flange used on the upper and lower plate can be varied between the male/female configuration so that the flange present on the upper plate 11 does not necessarily have to match the flange configuration present on the lower plate 15.

Figure 2:
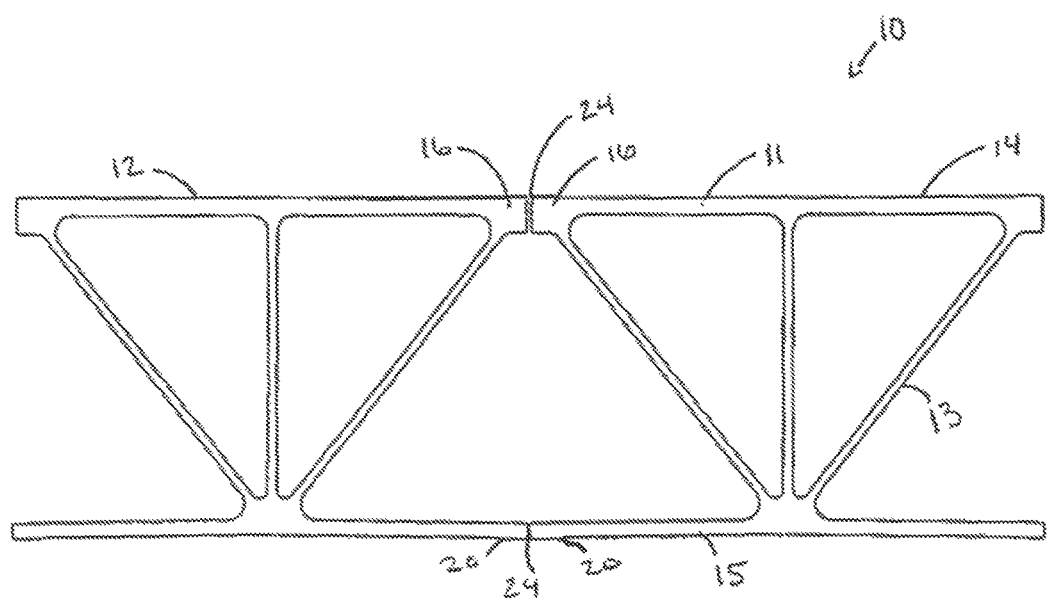
FIG. 2 is an exemplary vertical elevation view of abutment joints between adjacent panel members.
Figure 3:
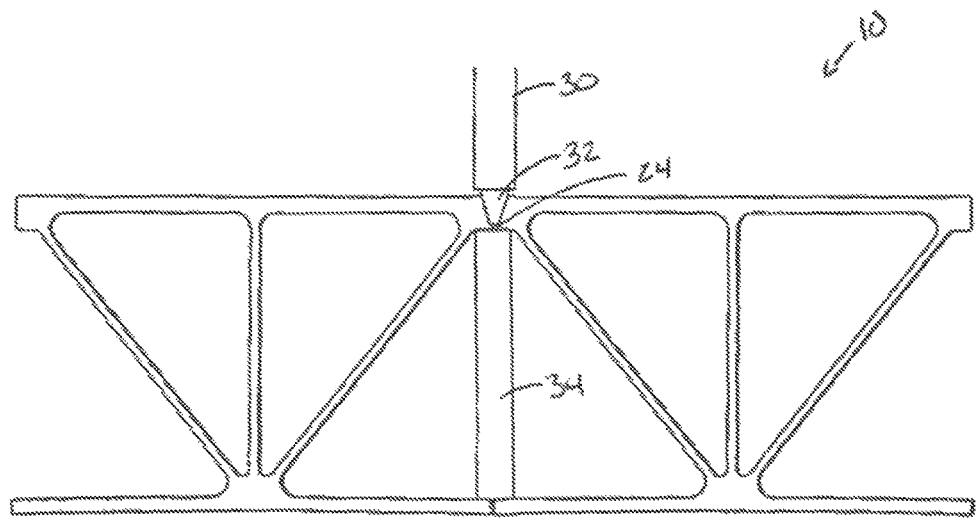
FIG. 3 is an exemplary vertical elevation view of an FSW pin being applied to the surface of an upper plate of an abutment joint in a panel with an anvil beneath the upper surface.

The flange configurations depicted in FIG. 1 may be varied. For example, either or both of the upper and lower flanges may be configured as simply a blunt vertical surface. Each blunt vertical surface of each respective upper and lower flange would be positioned to be in contact prior to the using a FSW process to secure the structural members together. As shown in FIGS. 2 and 3, either the mated flanges or blunt flanges may be used in the connection between the structural members shown in FIG. 1.

FIG. 3 is an exemplary vertical elevation view of the application of an FSW pin 32 to upper panels of two panel members. As used herein, the blunt vertical surfaces 24 of each upper and lower flange 16, 20 may also be referred to as faying surfaces 24, or collectively, abutment joint 24. The panel members may be connected using an FSW tool 30 that is applied to weld together the adjacent surfaces 24 of the upper and lower flanges 16, 20. Once welding is complete, and the panel members are permanently connected, the joined region may be referred to as a weld line 24. As shown in FIG. 3, an FSW tool 30 comprises a pin 32 which imparts vertical and rotational frictional pressure on the faying surface 24 of the upper flange 16 of each panel member 12, 14. In order to counteract the vertical pressure of the FSW tool 30, an anvil 34 may be temporarily placed beneath the upper flanges 16 of each panel member 12, 14. The anvil 34 further distributes the vertical pressure from the FSW tool 30 to the lower panels 15 of each panel member 12, 14 and thereon to any surface by which the members 12,14 are supported (not depicted). In application, the members 12, 14 and the FSW tool 30 must move in opposite directions relative to one another. Effectively, the FSW tool traverses across the members 12, 14. In the embodiment of FIG. 2, for example, the FSW tool 30 moves along the path of the faying surface 24 in the direction of the extrusion profile.

In the FSW process shown in FIG. 3, a second FSW tool 30 may be used to join the faying surfaces 24 of the lower flanges 20. It may also be possible to articulate the FSW tool 30 to a location beneath the members 12, 14. Alternatively, the panel members 12, 14 may be repositioned so that the lower plate and abutment joint is located at the top of the panel and the FSW tool 30 can be reapplied.

During the FSW process described above, there is a tendency for the adjacent panel members 12, 14 to be forced laterally apart. In order to hold the panel members 12, 14 together until the welding process is complete, laterally clamping forces may be applied. Thus, the FSW welding apparatus must be provided with a lateral clamping mechanism for holding the panel members 12, 14 in position by applying a lateral force from one or more directions to force and hold the panel members 12, 14 in position to be welded. In certain FSW processes, it may also be desirable to include a vertical clamping mechanism to prevent bowing of the panel members 12, 14. The need to provide clamping mechanisms (e.g., a hydraulic clamp) adds to the complexity and cost of the FSW process. Therefore, there is a need to improve the FSW process for connecting panel members to eliminate or reduce the forces required to hold the panel members in position during welding. In addition, various problems occur as a result of the manufacturing extrusion process, which can make it difficult to employ typical FSW methods to panel members. Thus, a self-aligning structure, such as disclosed herein, is needed for the enhanced consistency of FSW welding applications to join structural panel. FIGS. 4-9 disclose alternative embodiments that provide for improved panel structure.

Figure 4:
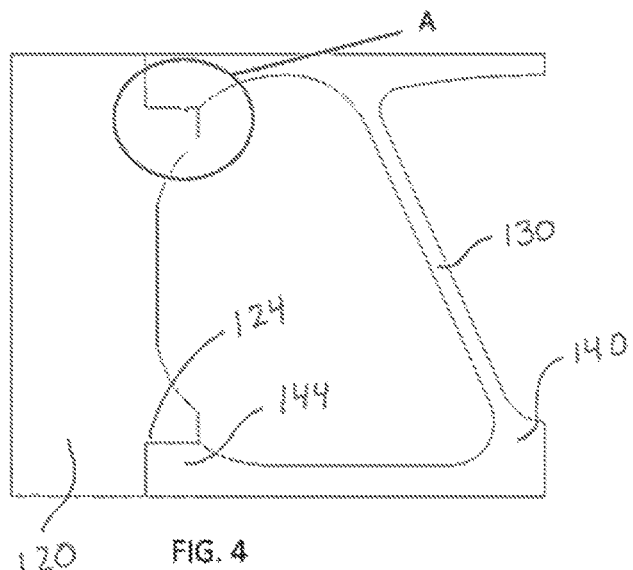
FIG. 4 is an exemplary vertical elevation view of exemplary abutment joints between adjacent panel members.
Figure 5:
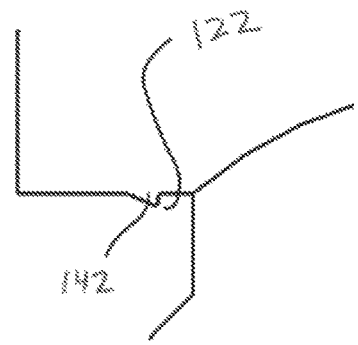
FIG. 5 is a close up elevated view of the abutment joint shown in region A of FIG. 4.

FIGS. 4 and 5 disclose views of a pair of panel members 140, 120 connected together prior to the commencement of the FSW process. As shown in the exemplary arrangement of FIG. 4, the second panel member 140 includes a supporting web 130 and two connection flanges configured in a male configuration. The structural elements disclosed herein are referred to as panel members, and the term panel is intended to encompass a planar surface whether vertical, horizontal or other orientation. The first panel member 120 includes female configured flanges at the top and bottom plates. As shown in FIG. 4, the top plate of the first panel member 120 may include a female configured flange 124 that mates with a male configured flange 144 of the second panel member 140. As shown in FIG. 5, the abutting connection between the top plates of the first and second panel members 120, 140 includes a tongue and groove arrangement. For example, the second panel member 140 may include a male configured flange that includes a downwardly projecting protrusion 142 that fits in a complementary groove or recess 122 located in the first panel member 124. As shown in FIG. 5, the protrusion 142 is angular and tooth shaped. The ramped surface of the protrusion 142 facing the first panel member 120 facilitates the process for connecting the first and second panel members 120, 140.

Figure 6:
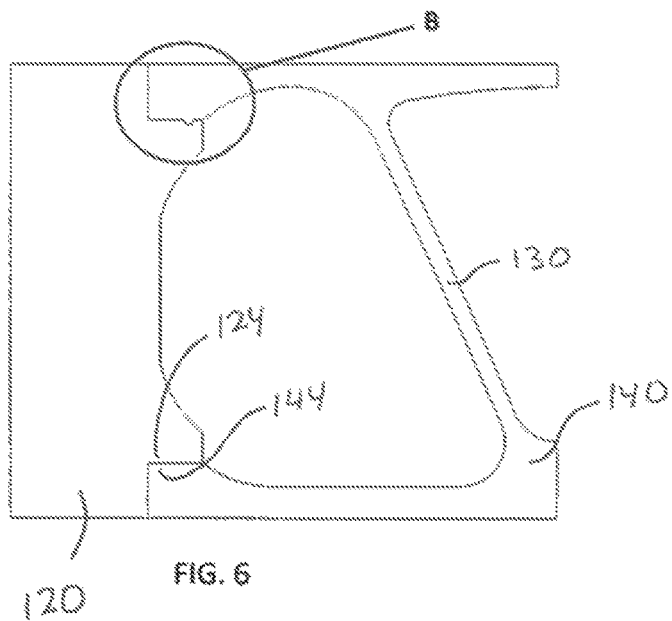
FIG. 6 is an exemplary vertical elevation view of exemplary abutment joints between adjacent members.
Figure 7:
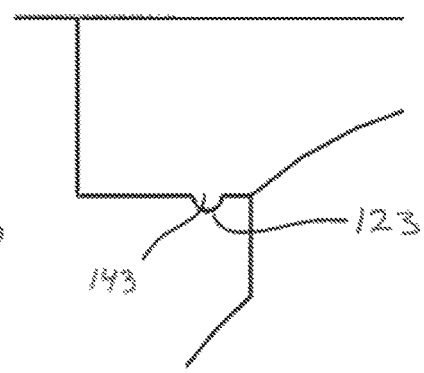
FIG. 7 is a close up elevated view of the abutment joint shown in region B of FIG. 6.

FIGS. 6 and 7 disclose another alternative embodiment of configuration for connecting panel members. The first panel member 120 includes female configured flanges at the top and bottom plates. As shown in FIG. 6, the bottom plate of the first panel member 120 may include a female configured flange 124 that mates with a male configured flange 144 of the second panel member 140. As shown in FIG. 6, the abutting connection between the top plates of the first and second panel members 120, 140 includes a tongue and groove arrangement. For example, the second panel member 140 may include a male configured flange that includes a downwardly projecting protrusion 143 that fits in a complementary groove or recess 123 located in the first panel member 124. As shown in FIG. 7, the protrusion 143 is curved, preferably rounded. The curved surface of the protrusion 143 facing the first panel member 120 facilitates the process for connecting the first and second panel members 120, 140.

Figure 8:
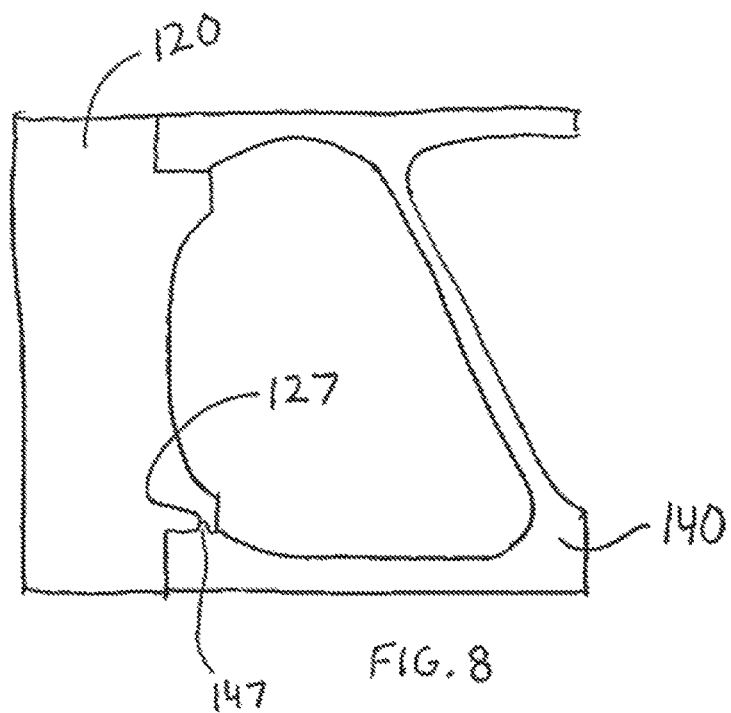
FIG. 8 is an exemplary vertical elevation view of exemplary abutment joints between adjacent panel members.
Figure 9:
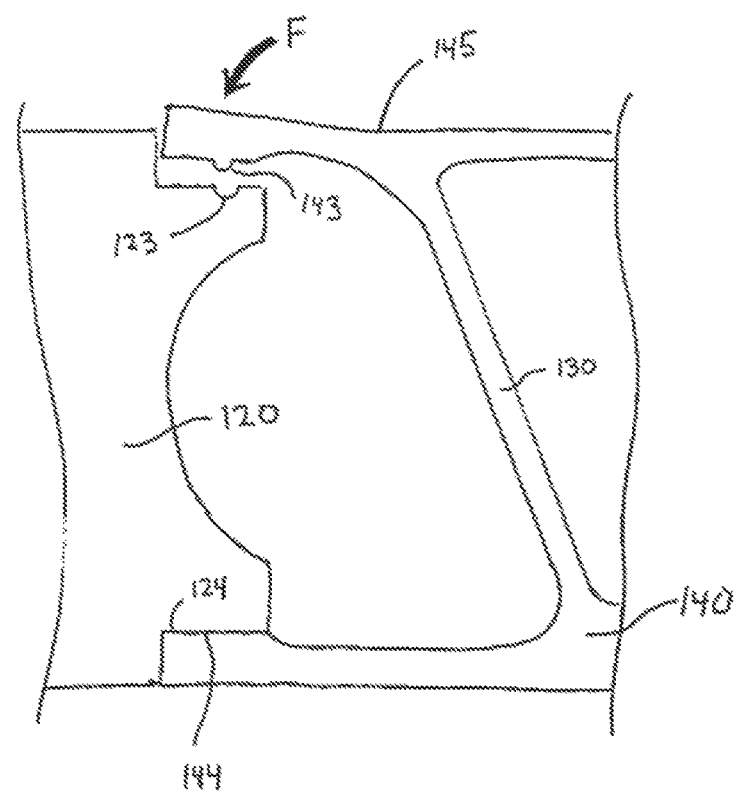
FIG. 9 is an exemplary vertical elevation view of exemplary abutment joints between adjacent panel members.

FIG. 8 discloses another alternative embodiment of configuration for connecting panel members. The first panel member 120 includes female configured flanges at the top and bottom plates. As shown in FIG. 6, the bottom plate of the first panel member 120 may include a female configured flange 124 that mates with a male configured flange 144 of the second panel member 140. As shown in FIG. 6, the abutting connection between the top plates of the first and second panel members 120, 140 includes a tongue and groove arrangement. For example, the second panel member 140 may include a male configured flange that includes an upwardly projecting protrusion 147 that fits in a complementary groove or recess 127 located in the first panel member 120. As shown in FIG. 8, the protrusion 143 is curved, preferably rounded. Other shaped projections may be used that facilitates the process for connecting the first and second panel members 120, 140.

The connected panel members disclosed in FIGS. 4-8 are configured to resist lateral separation due to the provision of the tongue and groove type connection. Thus, the disclosed members reduce or eliminate the need for providing lateral clamping structures that were previously required to maintain the panel members in position during the FSW process. In FIGS. 4-9, the projection or male feature is shown to project downwardly or away from the top plate of one of the panel members. In an alternative embodiment, the projection or male feature may be configured to project upwardly into an open groove or recess facing downwardly from the top or bottom plate (see FIG. 8) of the adjacent panel member. Thus, the overlapping flanges of the top plate may be configured as ether "male" or "female." Also, as shown in FIG. 8, the projection is located away from the weld zone of the abutting structural members. Thus, the projection and groove would not be consumed by a welding process. Alternatively, the projection could be located at the end of one of the flanges that extends from each of the top and bottom plates.

The panel members 120, 140 are preferably formed by extruding aluminum. Certain extruded aluminum sections may provide for a limited amount of flexibility to facilitate the connection of adjoining sections. However, for significant weight bearing applications (e.g., roads, bridges, rail cars, etc.) the required sectional modulus for the panel members is significant and, thus, the extruded panel members are generally not flexible. Thus, significant force may be required in order to connect the adjoining sections of panel members prior to welding. The shape of the projections disclosed in FIGS. 4-8 functions to facilitate the connection. For example, the inclined ramp of the projection 142 shown in FIG. 5 may slide over the female portion of the first panel member and into the groove 122. Similarly, the curved portion of the projection 143 shown in FIG. 7 will not catch or hang up on the corner of the female portion of the first panel member 120 thereby allowing the panel members 120, 140 to slide relative to one another and the projection member 143 to lodge into position in the groove 123.

In certain configurations, it may not be feasible to simply force or slide the adjacent panel members into a connected position prior to welding. As shown in FIG. 8, it may be necessary to configure the end of one of the panel members (the second panel member 140, for example) to be in a position spaced apart from the adjacent panel member. The panel member 140, for example, may hinge a location 145 on the top late so that when a force F is applied vertically downward on the top plate of the panel member, the top plate bends downward and the projection 143 is forced into the groove 123. Alternatively, the overlying flange of one of the panel members may include a recess or groove that is forced downwardly to engage an upwardly extending projection in the adjacent panel member.

The construction and arrangement of the structural members as shown in the preferred and other exemplary embodiments is illustrative only. Although only a few embodiments of the present structural assembly have been described in detail in this application, those skilled in the art who review this disclosure will readily appreciate that many modifications are possible (e.g. variations in sizes, dimensions, structures, shapes and proportions of the various elements, values of parameters, mounting arrangements, use of materials, orientations, etc.) without materially departing from the novel teachings and advantages of the subject matter recited in this application. Accordingly, all such modifications attainable by one versed in the art from the present disclosure within the scope and spirit of the present invention are to be included as further embodiments of the present invention. The order or sequence of any process or method steps may be varied or re-sequenced according to alternative embodiments. Other substitutions, modifications, changes and omissions may be made in the design, operating conditions and arrangement of the preferred and other exemplary embodiments without departing from the spirit of the present application.

What is claimed is:

1. A panel structure adapted to be friction stir welded, comprising:

a first panel member arranged against a second panel member, the first and second panel members being configured to be connected by friction stir welding, wherein each of the first and second panel members include (1) a first plate, (2) a second plate substantially in parallel to the first plate, and (3) at least one webbing member connecting the first plate and the second plate;

the first plate of the first panel member includes a flange positioned in abutment with a flange located on the first plate of the second panel member, the flange of the first panel member and the flange of the second panel member each including a horizontal surface;

the horizontal surface of the flange of the first panel member and the horizontal surface of the flange of the second panel member are interior and parallel to an exterior surface of first panel member and an exterior surface of the second panel member;

the horizontal surface of the flange of the first panel member includes a projection that projects in a direction toward the second plate of the first panel member, and the horizontal surface of the flange of the second panel member includes a groove that opens in a direction away from the second plate of the second panel member;

a shape of the projection facilitates relative movement of the horizontal surfaces of the flanges of the first and second panel members toward a position in which the projection is engaged with the groove; and the first and second panel members are connected so that the projection is engaged with the groove to thereby resist relative lateral movement in a direction parallel to the first and second plates that would separate the first and second panel members.

2. The panel structure of claim 1, wherein the projection is tooth shaped and includes a ramp surface and a pointed end configured to facilitate relative movement of the first and second panel members toward a position in which the projection is engaged with the groove.

3. The panel structure of claim 1, wherein the projection includes a curved surface having a shape configured to facilitate relative movement of the first and second panel members toward a position in which the projection is engaged with the groove.

4. The panel structure of claim 1, wherein the flange portion of the first panel member is positioned so that when the first and second panel members move laterally relative to each other into a position where the first and second panel members abut each other, the projection cannot engage the groove until an external force is applied on the first plate of the first panel member to thereby force the projection into the groove.

5. The panel structure of claim 4, wherein the first plate of the first panel member includes a hinge region wherein the flange of the first plate pivots when the first panel member is forced toward the second panel member.

6. The panel structure of claim 1, wherein the first and second panel members are configured to move laterally toward each other so that the projection can move into position to engage the groove.

7. The panel structure of claim 1, wherein the second plate of the first panel member includes a flange positioned to be in abutment with a flange of the second plate of the second panel member.

8. The panel structure of claim 7, wherein the second plates of the first and second panel members are welded together by friction stir welding in a portion of the structure where the flanges of the second plates are in abutment.

9. A panel structure including structural members connected together by a friction stir welding process, comprising:

a first panel member including top and bottom plates connected together by a plurality of ribs; and a second panel member including top and bottom plates connected together by a plurality of ribs, wherein the top plates of the first and second panel members are connected together using friction stir welding;

the top plate of the first panel member includes an interior horizontal surface having a projection that fits in a recess located on an interior horizontal surface of the top plate of the second panel member to thereby resist lateral separation of the panel members in a direction parallel to the top and bottom plates in response to forces applied to the panel members during the friction stir welding process;

the interior horizontal surface of the top plate of the first panel member and the interior horizontal surface of the top plate of the second panel member are parallel to an exterior surface of the first panel member and an exterior surface of the second panel member;

a shape of the projection facilitates relative movement of the horizontal surfaces toward a position in which the projection is engaged with the groove; and the projection extends downwardly from the top plate of the first panel member towards the recess located in an upwardly facing horizontal surface of the top plate of the second panel member.

10. The panel structure of claim 9, wherein the projection is located in a flange portion of the top plate of the first panel member, and wherein the recess is located in a flange portion of the top plate of the second panel member.

11. The panel structure of claim 10, wherein the flange portions overlap when the first and second panel members are connected.

12. The panel structure of claim 9, wherein the bottom plates of the panel members are positioned to be in abutment and to be connected using a friction stir welding process.

13. A method of assembling a panel structure from a plurality of structural members comprising the steps of:

providing first and second panel members, wherein each of the first and second panel members includes a first plate, a second plate substantially in parallel to the first plate, and at least one webbing member connecting the first plate and the second plate;

positioning the panel members so that a flange located on the first plate of the first panel member abuts a flange located on the first plate of the second panel member, the flange of the first panel member and the flange of the second panel member each including a horizontal surface; and connecting the first and second panel members using a friction stir welding process, wherein the positioning step includes positioning a projection located on the horizontal surface of the flange of the first panel member into engagement with a groove located on the horizontal surface of the flange of the second panel member to thereby resist relative lateral movement in a direction parallel to the first and second plates that would separate the panel members, a shape of the projection facilitating relative movement of the horizontal surfaces toward a position in which the projection is engaged with the groove; and the horizontal surface of the flange of the first panel member and the horizontal surface of the flange of the second panel member are interior and parallel to an exterior surface of the first panel member and an exterior surface of the second panel member.

14. The method of claim 13, wherein the positioning step includes relative lateral movement between the first and second panel members so that the projection slides across a surface of the flange of the second panel member prior to engaging with the groove.

15. The method of claim 14, wherein the projection includes a ramped surface and a pointed end that contacts the flange of the second panel member to facilitate the sliding of the projection.

16. The method of claim 13, wherein the positioning step includes both relative lateral movement between the first and second panel members until the panel members are abutting and further lateral movement cannot occur, and bending the first panel member so that the projection moves into engagement with the groove.

17. The method of claim 13, wherein the connecting step includes applying a friction stir weld to the first and second plates of the panel members.

18. The method of claim 13, further comprising the step of extruding aluminum to form the panel members.

* * * * *